US012616624B2

(12) United States Patent
Herbst et al.

(10) Patent No.: US 12,616,624 B2
(45) Date of Patent: May 5, 2026

(54) CHEST COMPRESSION SYSTEM RETAINER WITH TETHERS FOR USE WITH A PATIENT TRANSPORT APPARATUS

(71) Applicant: Stryker Corporation, Kalamazoo, MI (US)

(72) Inventors: Cory P. Herbst, Shelbyville, MI (US); Michael J. Hernandez, Portage, MI (US); Joshua B. White, Portage, MI (US); Patrick Lafleche, Kalamazoo, MI (US); Kevin M. Patmore, Plainwell, MI (US); Brandon David Naber, Portage, MI (US); Mats Eric Sandrup, Kävlinge (SE)

(73) Assignee: Stryker Corporation, Portage, MI (US)

( * ) Notice: Subject to any disclaimer, the term of this patent is extended or adjusted under 35 U.S.C. 154(b) by 976 days.

(21) Appl. No.: 17/844,380

(22) Filed: Jun. 20, 2022

(65) Prior Publication Data

US 2023/0190556 A1 Jun. 22, 2023

Related U.S. Application Data

(60) Provisional application No. 63/291,696, filed on Dec. 20, 2021.

(51) Int. Cl.
*A61G 7/10* (2006.01)
*A61G 1/044* (2006.01)
*A61H 31/00* (2006.01)

(52) U.S. Cl.
CPC ........... *A61G 7/1051* (2013.01); *A61G 1/044* (2013.01); *A61H 31/004* (2013.01); *A61H 2201/0192* (2013.01); *A61H 2205/084* (2013.01)

(58) Field of Classification Search
CPC .... A61G 7/1051; A61G 1/044; A61G 1/0567; A61G 1/0212; A61G 1/0237; A61G 1/04;
(Continued)

(56) References Cited

U.S. PATENT DOCUMENTS 4,060,079 A 11/1977 Reinhold, Jr.
4,198,963 A 4/1980 Barkalow et al.
(Continued)

FOREIGN PATENT DOCUMENTS

CN 208659874 U 3/2019
GB 1187274 A 4/1970

OTHER PUBLICATIONS

United States Non-Provisional U.S. Appl. No. 17/844,355, filed Jun. 20, 2022.
(Continued)

*Primary Examiner* — Kendra D Carter
*Assistant Examiner* — Arielle Wolff
(74) *Attorney, Agent, or Firm* — Howard & Howard Attorneys PLLC

(57) ABSTRACT

A patient care system for treating a patient is provided. The patient care system includes a patient transport apparatus, a chest compression system configured to provide automatic chest compressions to a patient, and a retainer for securing the chest compression system to the patient transport apparatus. The patient transport apparatus includes a base, an intermediate frame arranged for movement relative to the base, and a patient support deck which defines a patient support surface. The chest compression system includes a driver having a driver body movably supporting a plunger, and a driver frame to support the driver adjacent to the chest of the patient. The retainer includes a collar releasably engageable with the chest compression system, and a brace including a retainer mount and a tether. The brace is
(Continued)

arranged to secure the chest compression system to the intermediate frame of the patient transport apparatus.

18 Claims, 10 Drawing Sheets

(58) Field of Classification Search
CPC .......... A61H 31/004; A61H 2201/0192; A61H 2205/084; A61H 31/008; A61H 31/006; A61H 2201/0157; A61H 2201/123; A61H 2201/1652; A61H 2201/14; A61H 2011/005; A61H 11/00; A61H 11/02; A61H 2203/0456; A61H 2201/0142; A61H 2201/0138
See application file for complete search history.

(56) References Cited

U.S. PATENT DOCUMENTS

| | | | | |
|---|---|---|---|---|
| 5,697,572 | A * | 12/1997 | Salentine ................ | B63C 11/52 242/379 |
| 6,055,988 | A | 5/2000 | Perisho | |
| 6,059,742 | A | 5/2000 | Palmer | |
| 6,290,660 | B1 | 9/2001 | Epps et al. | |
| 7,226,427 | B2 | 6/2007 | Steen | |
| 7,398,571 | B2 | 7/2008 | Souke et al. | |
| 10,092,464 | B2 | 10/2018 | Ehrstedt et al. | |
| 10,568,805 | B2 | 2/2020 | Illindala | |
| 10,987,268 | B2 | 4/2021 | Souke et al. | |
| 11,103,277 | B2 | 8/2021 | Arnold et al. | |
| 2014/0276269 | A1 | 9/2014 | Illindala | |
| 2014/0323816 | A1 | 10/2014 | Soderberg et al. | |
| 2015/0182419 | A1 | 7/2015 | Clowdus | |
| 2016/0095765 | A1 * | 4/2016 | Ehrstedt ............... | A61H 31/008 128/869 |
| 2016/0338904 | A1 | 11/2016 | Lurie et al. | |
| 2017/0156977 | A1 | 6/2017 | Walden et al. | |
| 2017/0266077 | A1 | 9/2017 | Mackin | |
| 2018/0303689 | A1 | 10/2018 | Souke et al. | |
| 2019/0029920 | A1 * | 1/2019 | Kostic .................... | A61G 1/048 |
| 2019/0117502 | A1 * | 4/2019 | Arbuck ................ | A61H 31/005 |
| 2019/0274920 | A1 | 9/2019 | Williams | |
| 2021/0186781 | A1 | 6/2021 | Souke et al. | |
| 2021/0196564 | A1 | 7/2021 | Stemple | |
| 2022/0062098 | A1 | 3/2022 | Jamal | |
| 2022/0125675 | A1 | 4/2022 | Ehrstedt et al. | |
| 2023/0027314 | A1 | 1/2023 | Davis | |

OTHER PUBLICATIONS

United States Non-Provisional U.S. Appl. No. 17/844,392, filed Jun. 20, 2022.
English language abstract and machine-assisted English translation for CN 208659874 U extracted from espacenet.com and Google Patents databases on Dec. 18, 2025, 6 pages.

* cited by examiner

CHEST COMPRESSION SYSTEM RETAINER WITH TETHERS FOR USE WITH A PATIENT TRANSPORT APPARATUS

CROSS-REFERENCE TO RELATED APPLICATION

The subject patent application claims priority to and all the benefits of U.S. Provisional Patent Application No. 63/291,696, filed on Dec. 20, 2021, the disclosure of which is hereby incorporated by reference in its entirety.

BACKGROUND

Cardiopulmonary resuscitation (CPR) is a lifesaving technique useful in many medical emergencies in which a patient's breathing and/or heartbeat has stopped, such as for example following a heart attack or a near drowning. Chest compressions are a primary aspect of CPR, and involve firmly compressing the chest of the patient to keep oxygenated blood flowing to the brain and other vital organs until more definitive medical treatment can restore a normal heart rhythm. The administration of CPR requires the effort and attention of a caregiver, such an emergency medical technician (EMT), who is consequently generally unable to perform other treatment modalities that may benefit the patient suffering the medical emergency. The caregiver may also need to put themselves in danger in order to administer CPR, such as during ambulatory transport of the patient.

Devices have been developed which provide automatic chest compressions. One such device is the LUCAS™ family of chest compression systems, available from Physio-Control, Inc. This type of chest compression system utilizes a mechanical plunger to provide the chest compressions with the appropriate force and at the appropriate intervals. One notably useful application of the chest compression system is during transport of a patient supported on a patient transport apparatus, such as hospital bed, a stretcher, a cot, and the like. Additionally, it will be appreciated that providing automatic chest compressions during ambulance transport—often associated with high-speed driving, risky maneuvers, and/or hazardous road conditions—may mitigate the need for caregivers to perform CPR while standing unrestrained in a confined space.

Due to the elevation of the patient support surface on which the patient is supported, especially during ambulatory transport, the caregivers or other treating medical professionals may need to closely monitor the stability of the chest compression system (and the patient) supported on the patient transport apparatus, and may need to provide attention to or otherwise manually assist with stabilizing and/or repositioning the chest compression system. As a result, the medical professionals may be inhibited from performing other types of treatment or patient cate. Moreover, in some circumstances, the caregiver may not be able to assist with stabilizing the chest compression system, and may have to attend to other types of treatment or patient care.

A patient care system designed to address one or more of the aforementioned challenges is desired.

SUMMARY

The present disclosure provides a patient care system for treating a patient. The patient care system includes a patient transport apparatus, a chest compression system configured to provide automatic chest compressions to a patient, and a retainer for securing the chest compression system to an intermediate frame of the patient transport apparatus. The patient transport apparatus includes a base arranged for movement along floor surfaces, an intermediate frame arranged for movement relative to the base between a plurality of vertical configurations, and a patient support deck operatively attached to the intermediate frame which defines a patient support surface for supporting the patient. The chest compression system includes a driver having a driver body movably supporting a plunger arranged for providing chest compressions to the patient. The chest compression system further includes a driver frame with a base driver mount disposed on the patient support surface and lateral driver mounts extending between the base driver mount and the driver body to support the driver adjacent to the chest of the patient. The retainer includes a collar shaped for releasable engagement with the driver of the chest compression system, and a brace including a retainer mount and a tether. The tether extends longitudinally and laterally between the retainer mount and the collar to brace the collar and the driver of the chest compression system relative to the intermediate frame of the patient transport apparatus.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION

Figure 1:
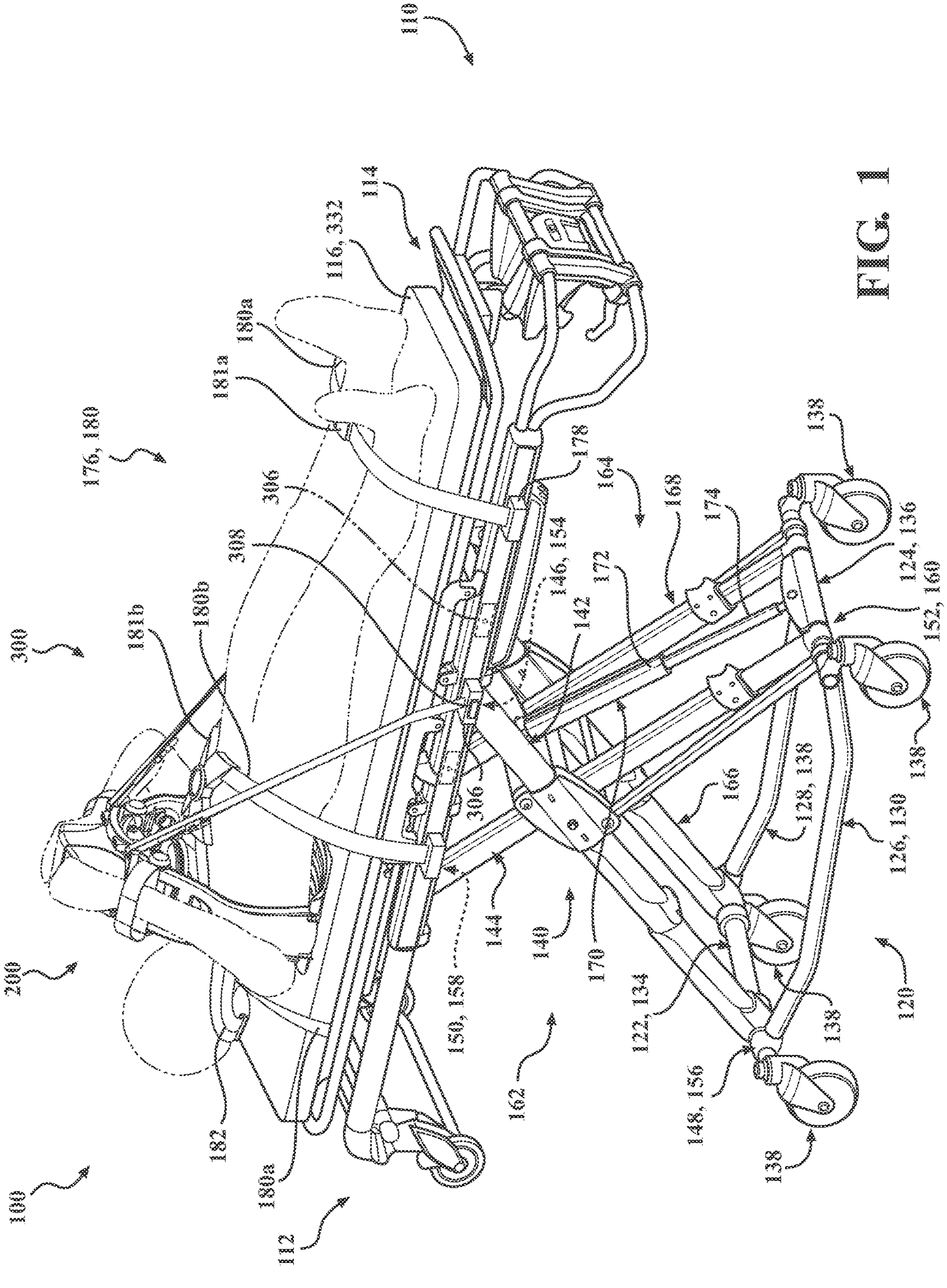
FIG. 1 is a perspective view of a patient care system including a chest compression system secured to a patient transport apparatus by a retainer.

Referring to FIG. 1, a patient care system 100 is shown for treating a patient in a health care and/or transportation setting. The patient care system 100 generally includes a patient transport apparatus 110 for supporting the patient, a chest compression system 200 configured to provide automatic chest compressions to the patient, and a retainer 300 for securing the chest compression system 200 relative to the patient transport apparatus 110. The patient transport apparatus 110 illustrated in FIG. 1 is realized as a cot. In other versions however, the patient transport apparatus 110 may be a hospital bed, stretcher, table, wheelchair, chair, or similar apparatus utilized in the transportation and care of a patient.

As shown in FIG. 1, the patient transport apparatus 110 includes an intermediate frame 112 configured to support the patient. The intermediate frame 112 may be coupled to a variety of components that aid in supporting and/or transporting the patient. For example, in FIG. 1, the intermediate frame 112 is coupled to a patient support deck 114 defining a patient support surface 116 upon which the patient directly rests. The patient support deck 114 may be defined by one or more articulable deck sections, for example, a fowler deck section, a seat deck section, a leg deck section, and a head deck section, to facilitate care and/or transportation of the patient in various patient positions. The various deck sections have been simplified in the present figures, however, the intermediate frame 112 and corresponding deck sections can be like that shown in U.S. Patent Application Publication No. 2018/0303689 A1, which claims priority to U.S. Provisional Patent Application No. 62/488,441, filed on Apr. 21, 2017, entitled, "Emergency Cot With A Litter Height Adjustment Mechanism," the disclosures of which are hereby incorporated by reference in their entirety.

The patient transport apparatus 110 includes a base 120. As shown in FIG. 1, the base 120 may include two opposing lateral base sides 122, 124 coupled to two opposing longitudinal base sides 126, 128. As shown in FIG. 1, the longitudinal base sides 126, 128 may include longitudinally-extending rails 130, 132 and the lateral base sides 122, 124 may include crosswise-extending rails 134, 136 which may be coupled at the ends thereof to the rails 46, 48.

The base 120 may further include a plurality of caster wheel assemblies 138 operatively connected adjacent to each corner of the base 120 defined by the longitudinally-extending rails 130, 132 and the crosswise-extending rails 134, 136. As such, the patient transport apparatus 110 of FIG. 1 includes four caster wheel assemblies 138. The wheel assemblies 54 may be configured to swivel to facilitate turning of the patient transport apparatus 110. The wheel assemblies 54 may include a swivel locking mechanism to prevent the wheel assemblies 54 from swiveling when engaged. The wheel assemblies 54 may also include wheel brakes (not shown) to prevent rotation of the wheel.

The patient transport apparatus 110 may also include a lift mechanism 140 interposed between the base 120 and the intermediate frame 112. The lift mechanism 140 may be configured to move between a plurality of vertical configurations including an extended configuration where the intermediate frame 112 is elevated relative to the base 120, as shown in FIG. 1, and a retracted configuration (not shown) where the intermediate frame 112 is lowered such that it is in closer proximity to the base 120. The lift mechanism 140 can be like that shown in U.S. Patent Application Publication No. 2018/0303689 A1, incorporated above.

While moving between the plurality of vertical configurations, the lift mechanism 140 moves either the base 120 or the intermediate frame 112 relative to the other of the intermediate frame 112 or the base 120 depending on how the patient transport apparatus 110 is supported during use. For example, the patient transport apparatus 110 may be supported at the intermediate frame 112 when the patient transport apparatus 110 is being unloaded/loaded into an emergency response vehicle (not shown) and the patient transport apparatus 110 may be supported at the base 120 when the patient transport apparatus 110 is resting on a surface such as a hospital floor. In instances where the patient transport apparatus 110 is supported at the intermediate frame 112, the lift mechanism 140, while moving between the plurality of vertical configurations, moves the base 120 relative to the intermediate frame 112. In instances where the patient transport apparatus 110 is supported at the base 120, the lift mechanism 140, while moving between the plurality of vertical configurations, moves the intermediate frame 112 relative to the base 120.

The patient transport apparatus 110 may include a variety of components that allow the lift mechanism 140 to move between the plurality of vertical configurations. For example, the patient transport apparatus 110 may include a mechanism like that shown in U.S. Patent Application Publication No. 2018/0303689 A1, incorporated above.

In FIG. 1, the lift mechanism 140 includes a first frame member 142 and a second frame member 144, both of which are coupled to the intermediate frame 112 and the base 120. More specifically, the first frame member 142 includes a first end 146 pivotably coupled to the head-end of the intermediate frame 112 at a first connection point 154 such that the first frame member 142 may pivot about the first connection point 154. The first frame member 142 also includes a second end 148, which is pivotably coupled to a second connection point 156 such that the first frame member 142 may also pivot about the second connection point 156. Similarly, a first end 150 of the second frame member 144 may be pivotally coupled to the head-end of the intermediate frame 112 at a third connection point 158 such that the second frame member 144 may pivot about the third connection point 158. A second end 152 of the second frame member 144 may be pivotally coupled to a foot-end of the base 120 at a fourth connection point 160 such that the second frame member 144 may also pivot about the fourth connection point 160. Furthermore, a first end 146 of the first frame member 142 may be pivotally coupled to a foot-end of the intermediate frame 112.

As noted above, the first frame member 142 is pivotally coupled to the intermediate frame 112 at the connection point 154. Also shown, a second end 148 of the first frame member 142 may be pivotally coupled to a head-end of the base 120 at a connection point 156 such that the first frame member 142 may pivot about the connection point 156. Furthermore, the first frame member 142 and the second frame member 144 may be pivotally coupled to each other at the pivot axle 83 to form an "X" frame 162.

The lift mechanism 140 may include a second, similarly constructed X frame 164, which may include a third frame member 166 and a fourth frame member 168. Similar to X frame 162, the third frame member 166 and the fourth frame member 168 of X frame 164 may be pivotally coupled to a side of the intermediate frame 112 and a side of the base 120. For example, the third frame member 166 and the fourth frame member 168 of X frame 164 may be pivotally coupled to a side of the intermediate frame 112 and a side of the base 120, which oppose a side of the intermediate frame 112 and a side of the base 120 to which the first frame member 142 and the second frame member 144 are coupled. In one such version, as shown in FIG. 1, X frame 164 is coupled to the intermediate frame 112 and to the base 120, and X frame 162 is coupled to the intermediate frame 112 and to the base 120. It will be appreciated that any reference herein to the first frame member 142 may also be a reference to the third frame member 166. Similarly, any reference to the second frame member 144 may also be a reference to the fourth frame member 168.

In FIG. 1, the frame members 142, 144, 166, 168 are hollow and include telescopic sections such that the length of the frame members 142, 144, 166, 168 may be adjusted. However, in other examples, the frame members 142, 144, 166, 168 may be of solid construction and of a fixed length. Additionally, while the lift mechanism 140 of the representative version illustrated in FIG. 1 includes four frame members 68, 70, 86, 88, the lift mechanism 140 may include any suitable number of frame members.

Those having ordinary skill in the art will appreciate that the lift mechanism 140 may move between the plurality of vertical configurations due to a patient care provider applying a manual action to the lift mechanism 140, or components thereof. Additionally, or alternatively, the patient transport apparatus 110 may include one or more actuators 170, which may be coupled to any suitable component of the lift mechanism 140 and may be configured to move the lift mechanism 140 between the plurality of vertical configurations. As shown in FIG. 1, the illustrated actuator 170 is realized as a hydraulic linear actuator. In this particular version, the hydraulic linear actuator includes a cylindrical housing 172 the cylindrical housing 172 including a reciprocal rod 174 having a piston (not shown) located within the cylindrical housing 172. Extension and retraction of the reciprocal rod 174 will facilitate movement of the frame members 142, 166 of the lift mechanism 140.

The actuator 170 is further described in U.S. Pat. No. 7,398,571, filed on Jun. 30, 2005, entitled, "Ambulance Cot and Hydraulic Elevating Mechanism Therefor," the disclosure of which is hereby incorporated by reference in its entirety. Furthermore, techniques for utilizing actuator 170 to manipulate the components of the patient transport apparatus 110 can be like those described in U.S. Patent Application Publication No. 2018/0303689 A1, incorporated above.

In some versions, the actuator 170 may not be the hydraulic linear actuator shown in FIG. 1. The actuator 170 may be any actuator suitable for actuating the lift mechanism 140 such that the lift mechanism 140 moves between the plurality of vertical configurations. For example, the actuator 170 may be an electric motor, a servo motor, a pneumatic actuator, or any other suitable actuator.

As depicted in the drawings, the patient care system 100 may further include a patient harness assembly 176 for securing the patient to the patient transport apparatus 110. The patient harness assembly 176 includes a plurality of straps 180 for securing the patient to the patient transport apparatus 110. In order to secure the straps 180 to the patient transport apparatus 110 with sufficient strength to secure the patient, harness mounts 178 may be provided coupled to the intermediate frame 112 to secure the straps 180. In some versions, the harness mounts 178 may be realized as multi-piece connectors formed as a part of the straps 180 and/or the intermediate frame 112 and which interlock or otherwise releasably secure to each other. In some versions, the straps 180 may be realized as "loops" of webbing which can be wrapped around, passed through, or otherwise secured with portions of the intermediate frame 112 or other parts of the patient transport apparatus 110. Other configurations are contemplated.

In some versions, the plurality of straps 180 includes leg straps 180*a*, hip straps (not shown), waist straps 180*b*, and shoulder straps 180*c*. The leg straps 180*a*, the hip straps, and the waist straps 180*b* are spaced longitudinally from each other and attach via respective buckles 181*a*, 181*b*. Here, the buckle 181*b* which connects the waist straps 180*b* also releasably secures the shoulder straps 180*c*. It will be appreciated that patient harness assembly 176 may include different configurations and/or arrangements of straps, buckles, and the like. The harness mounts 178 may be movably coupled to the intermediate frame 112 such that they can be adjusted to fit the needs of the patient. Although not explicitly shown in the drawings, it will be appreciated that lengths of the plurality of straps 180 of the patient harness may be adjustable by any suitable length-adjustment apparatus. In some versions, the patient harness assembly 176 may further include a neck strap 182 for supporting the head and neck of the patient. The neck strap 182 may be secured to lateral driver mounts 208 of the chest compression system 200, described in greater detail below. In some versions, the neck strap 182 may be secured to at least one of the plurality of straps 180. Similar to the plurality of straps 180, a length of the neck strap 182 may be adjustable by any suitable length-adjustment apparatus. In this way, the neck strap 182 may be adjusted to meet the needs of the patient and/or the user.

Figure 2:
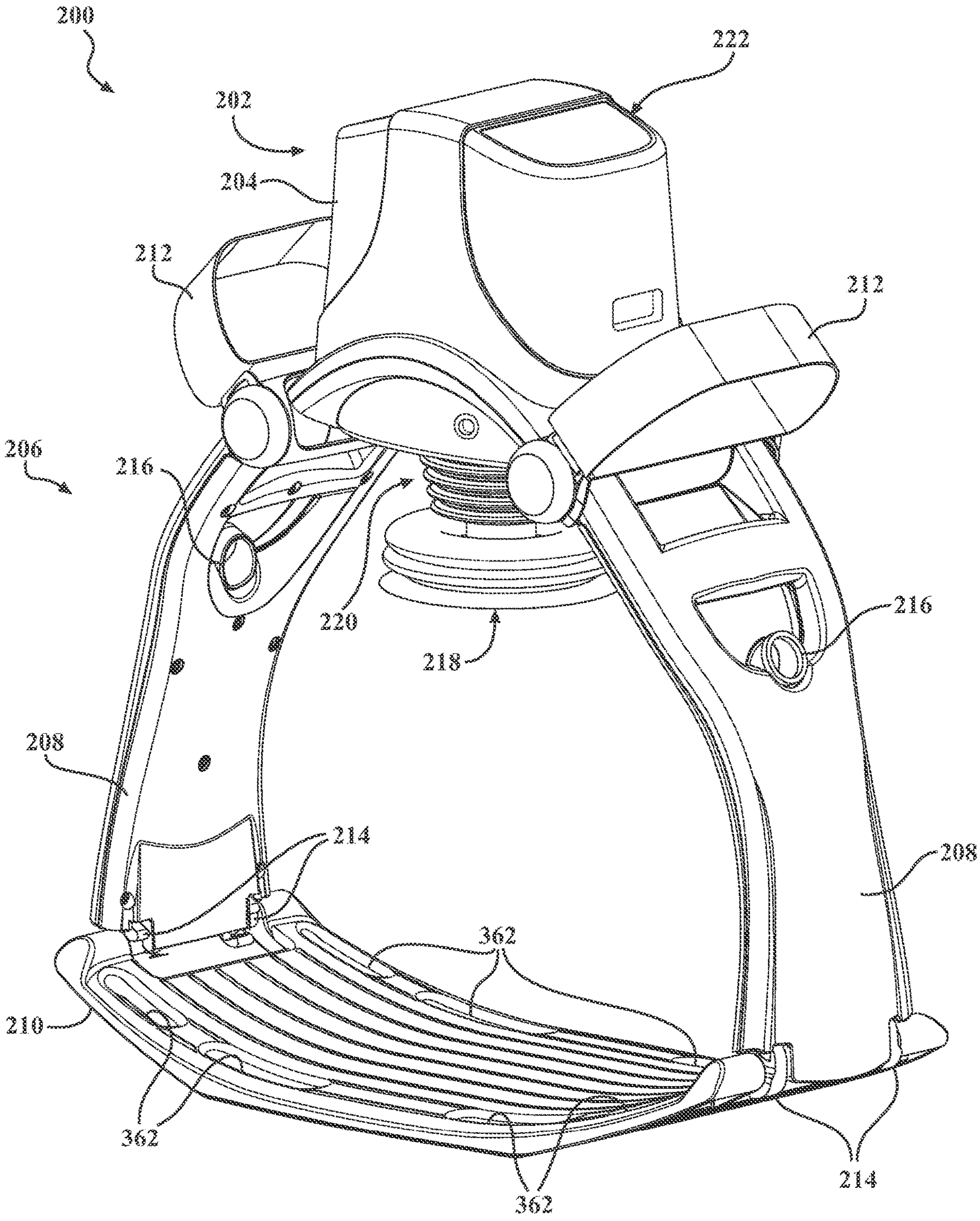
FIG. 2 is a perspective view of the chest compression system.

Now referring to FIG. 2, and as noted above, the patient care system 100 includes the chest compression system 200 for providing automatic chest compressions to the patient. The chest compression system 200 generally includes a driver 202 with a driver body 204 for movably supporting a plunger 218, and a driver frame 206 for supporting the driver 202 adjacent to a chest of the patient. In order to support the driver 202 relative to the chest of the patient, the driver frame 206 includes lateral driver mounts 208 extending between the driver body 204 and a base driver mount 210. The base driver mount 210 is typically disposed on the patient support surface 116 such that the base driver mount 210 is between the patient and the patient support surface 116. In such a configuration, as the driver 202 is providing downward force via the plunger 218, the base driver mount 210 may provide a corresponding upward force. This ensures that the downward force provided by the chest compression system 200 is absorbed by the chest of the patient and is not instead dissipated to, for example, the patient transport apparatus 110 upon which the patient is supported. Handles 212 may also be coupled to the driver frame 206, such as to lateral driver mounts 208, at a suitable position for securing the upper extremities of the patient to, among other things, avoid interference with the operation of the chest compression system 200.

In the illustrated version, the lateral driver mounts 208 of the chest compression system 200 are releasably coupled to the base driver mount 210. Here, the lateral driver mounts 208 may also be pivotably coupled to the base driver mount 210. Additionally, the lateral driver mounts 208 are of a suitable length to at least partially define a patient volume of sufficient size to receive the torso of the patient. At a junction between each of the lateral driver mounts 208 and the base driver mount 210, a locking mechanism 214 may be provided to releasably couple an end of the lateral driver mounts 208 to the base driver mount 210. Consequently, the base driver mount 210 may be separable from the remainder of the chest compression system 200 for various reasons, such as storage, transport, and disengaging the chest compression system 200 from the patient. Here, it will be appreciated that separability of the base driver mount 210 facilitates quick positioning and engagement of the chest compressions system with the patient. During use, the base driver mount 210 may be situated on the patient support surface 116, and the patient may be positioned on top of the base driver mount 210. After the patient has been positioned on the base driver mount 210, other portions of the chest compressions system 200, including the lateral driver mounts 208, are positioned near opposing ends of the base driver mount 210, and the locking mechanisms 214 may then be engaged to retain the lateral driver mounts 208 to the base driver mount 210.

One or both of the locking mechanisms 214 may be disengaged to facilitate adjustment of the chest compression system 200 relative to the patient and/or to facilitate removal of the chest compression system 200 after use. Here, a releasing member 216 coupled to the lateral driver mounts 208 may receive an input from a user to disengage the lateral driver mounts 208 from the base driver mount 210. The illustrated versions show the releasing member 216 as a "ring" configured to be moved upwardly relative to the base driver mount 210 to disengage the locking mechanisms 214. As the releasing member 216 is moved upward, the locking mechanism 214 is rotated out of engagement with at least one of the base driver mount 210 and the lateral driver mounts 208.

It will be appreciated that the driver body 204 and the lateral driver mounts 208 may be formed from separate components that are coupled together, or may be formed integrally in some versions. The driver body 204 houses a number of the electromechanical components of the chest compression system 200, including a piston rod 220 which extends to the plunger 218 as shown in FIG. 2. The piston rod 220 is powered by a motor (not shown) which moves the piston rod 220, and therefore the plunger 218, between retracted positions and extended positions. The plunger 218 may also be actuated with any suitable form of propulsion, for example, electric, electromagnetic, pneumatic, and the like. As the plunger 218 moves between positions while situated on the patient, the patient receives automatic chest compressions analogous to those which would otherwise be provided by a physician performing CPR.

In order to allow the user to control the chest compression system 200, a control panel 222 may be disposed on the driver body 204. The control panel 222 is configured to receive inputs from the user, which may have or facilitate carrying out various functions. For example, start, stop, reset, and similar functions may be used as inputs sent to the chest compression system 200 via the control panel 222. As shown in FIG. 2, the control panel 222 may include depressible buttons to provide these types of inputs. In other versions, the control panel 222 may be remote from the chest compression system 200. For example, the control panel 222 may take the form of a transceiver located anywhere on the chest compression system 200 which receives control signals from a remote source, such as a controller, smartphone, tablet, keyboard, and the like.

Certain operative and structural features of the chest compression system 200 are further disclosed in U.S. Pat. No. 7,226,427, issued Jul. 5, 2007, and entitled SYSTEMS AND PROCEDURES FOR TREATING CARDIAC ARREST, the entire contents of which are hereby incorporated by reference. Additionally, other features of the chest compression system 200 are disclosed in U.S. Patent Application Publication No. 2019/0117502, published Apr. 25, 2019, and entitled PATIENT SUPPORT APPARATUS FOR RELEASABLY SECURING A CHEST COMPRESSION SYSTEM, the entire contents of which are hereby incorporated by reference.

It will be appreciated that, even with the weight of the patient properly positioned on the base driver mount 210, the weight distribution of the chest compression system 200 may render it prone to inadvertent movement on the patient transport apparatus 110, particularly during transport. This type of inadvertent movement may be especially undesirable when the patient care system 100 is situated in an ambulance or other vehicle used to transport the patient care system 100. More specifically, not only must the chest compression system 200 remain located adjacent to the chest of the patient to continue performing chest compressions on the patient, but must also remain retained relative to the patient and to the patient transport apparatus 110 under a number of different use case scenarios and/or operating conditions. Here, the retainer 300 facilitates reliably securing the chest compression system 200 relative to the patient transport apparatus 110.

Figure 3:
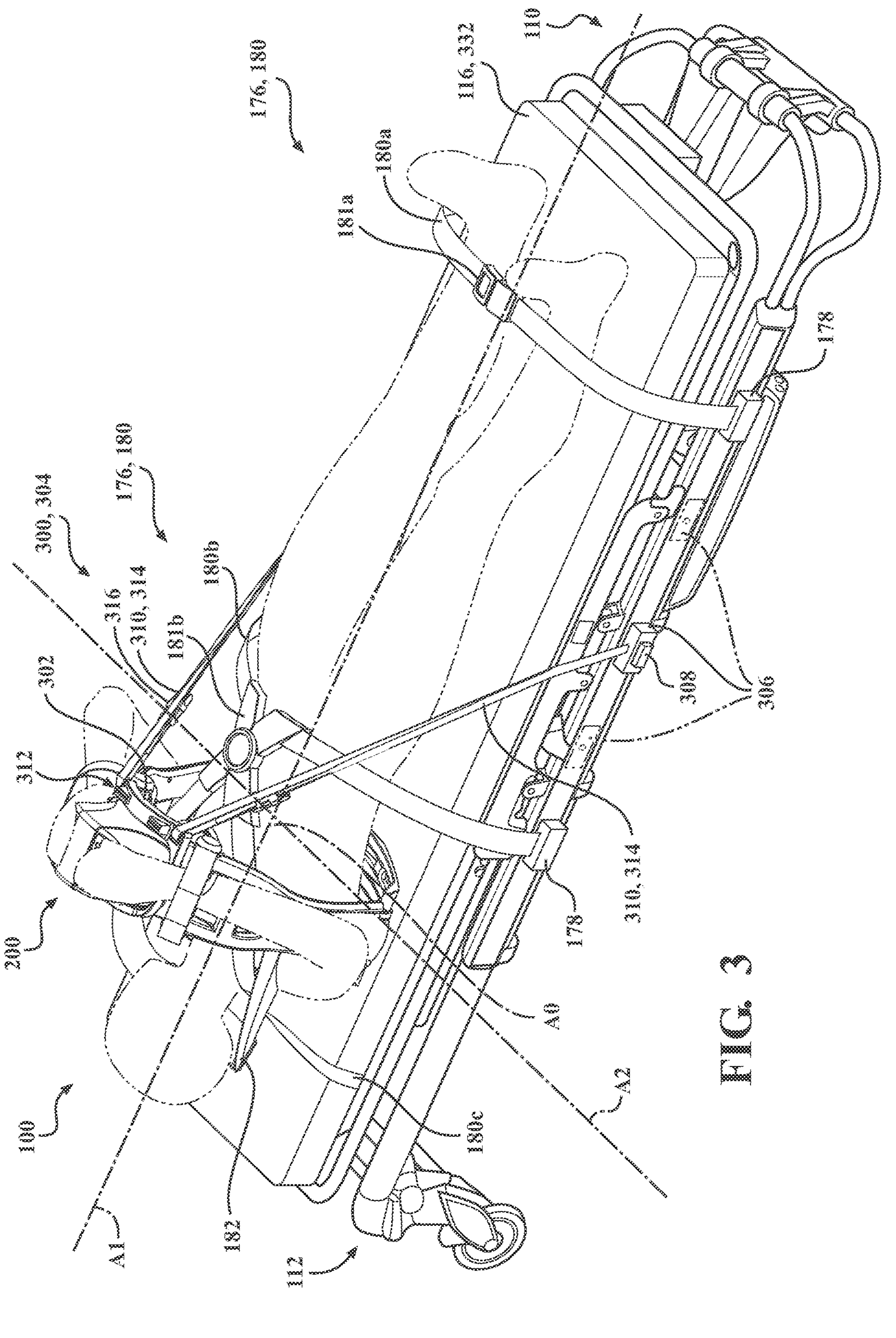
FIG. 3 is a partial view of the patient care system with retractable tethers.
Figure 4:
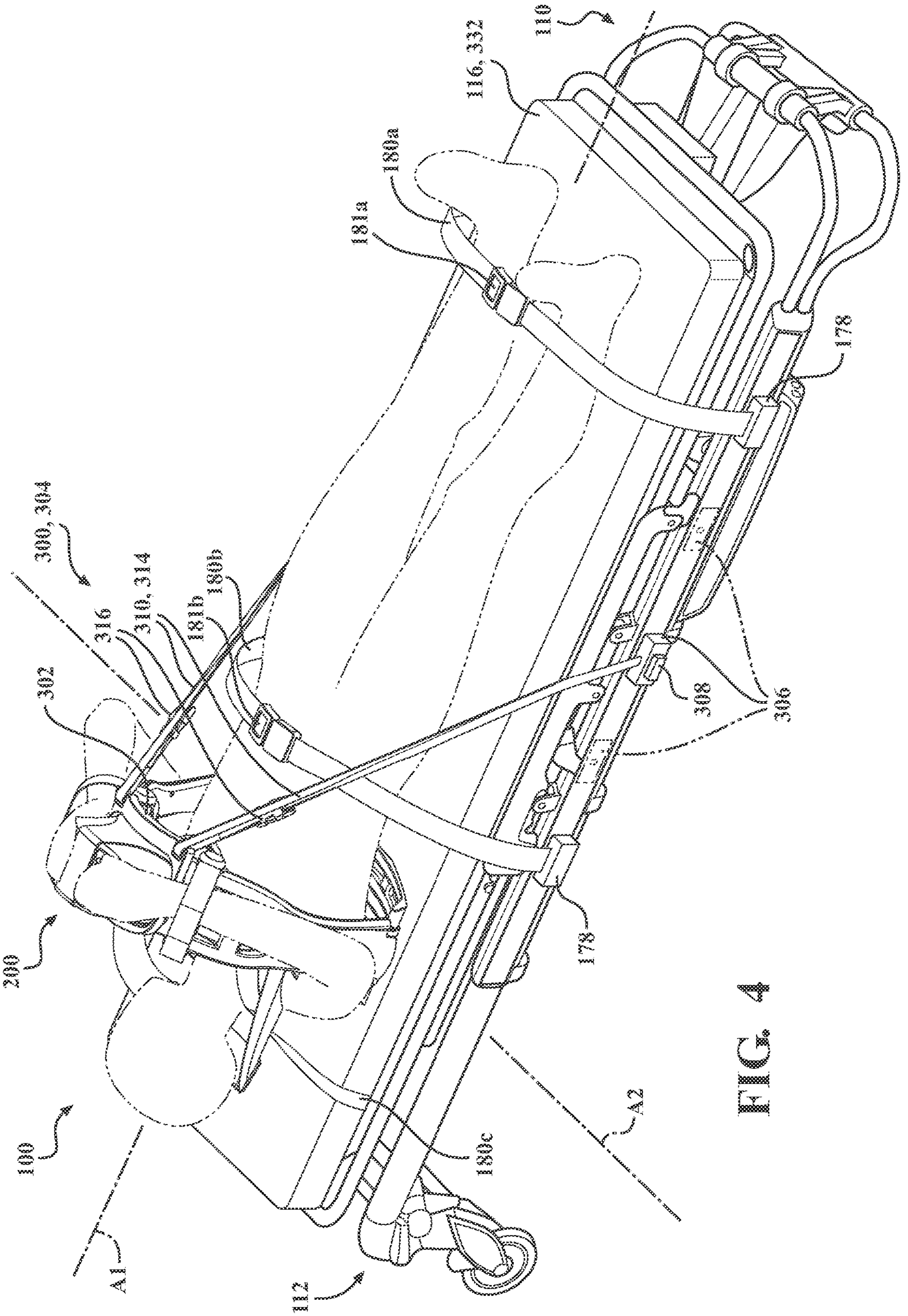
FIG. 4 is a partial view of the patient care system with loop-strap tethers.
Figure 5:
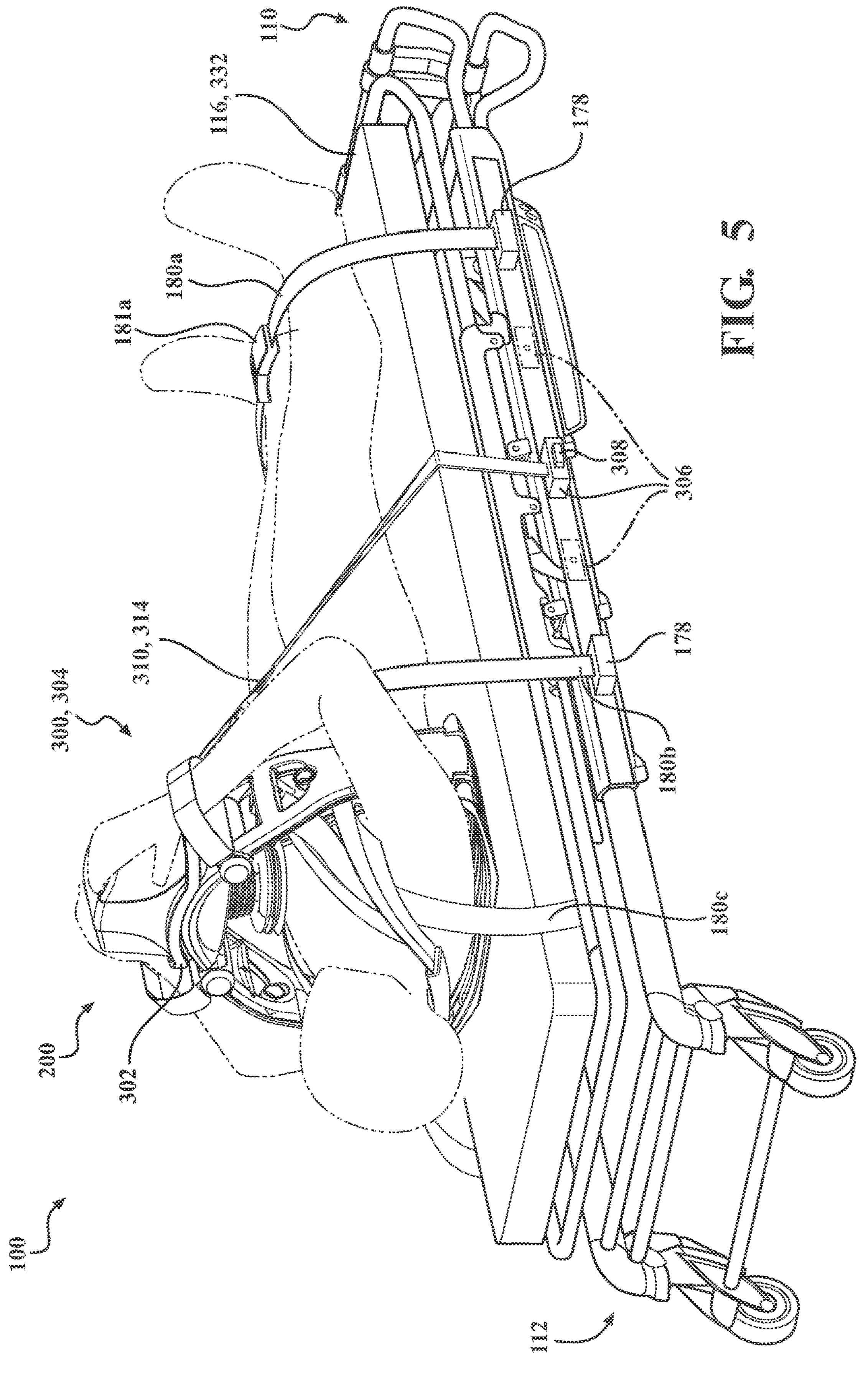
FIG. 5 is an alternative partial view of the patient care system.
Figure 6A:
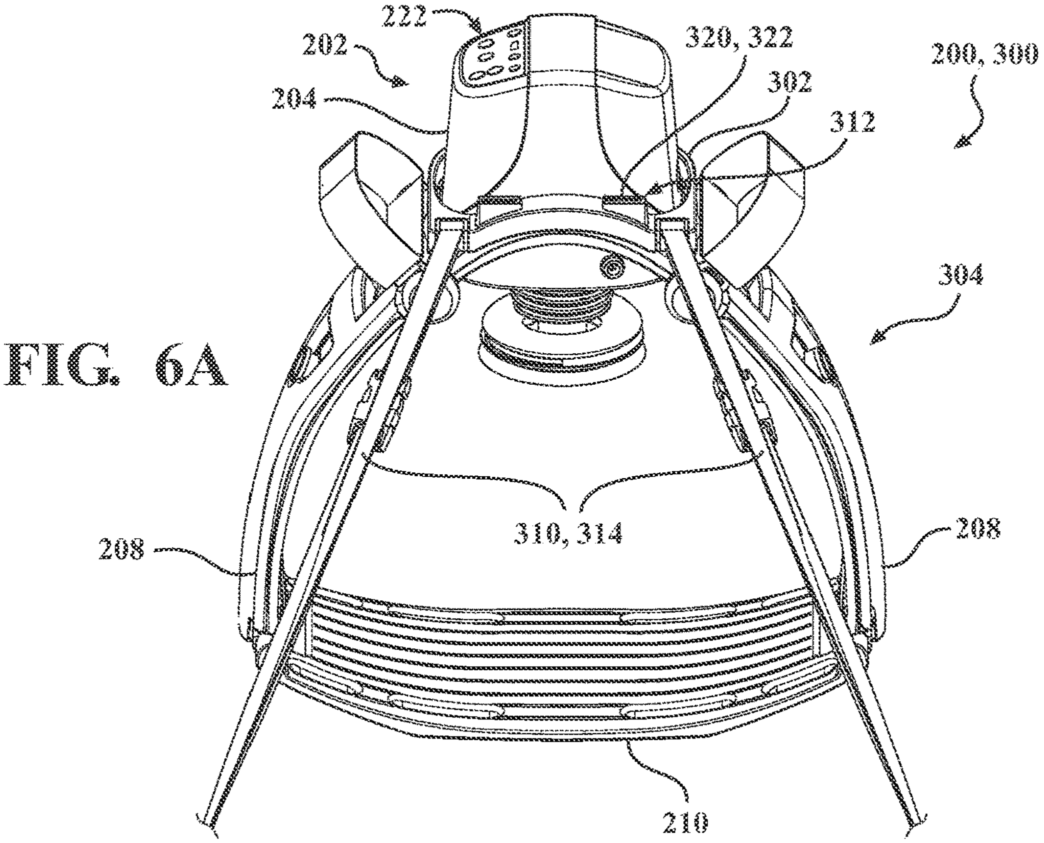
FIGS. 6A-6B are perspective views of the retainer engaged with the chest compression system.
Figure 6B:
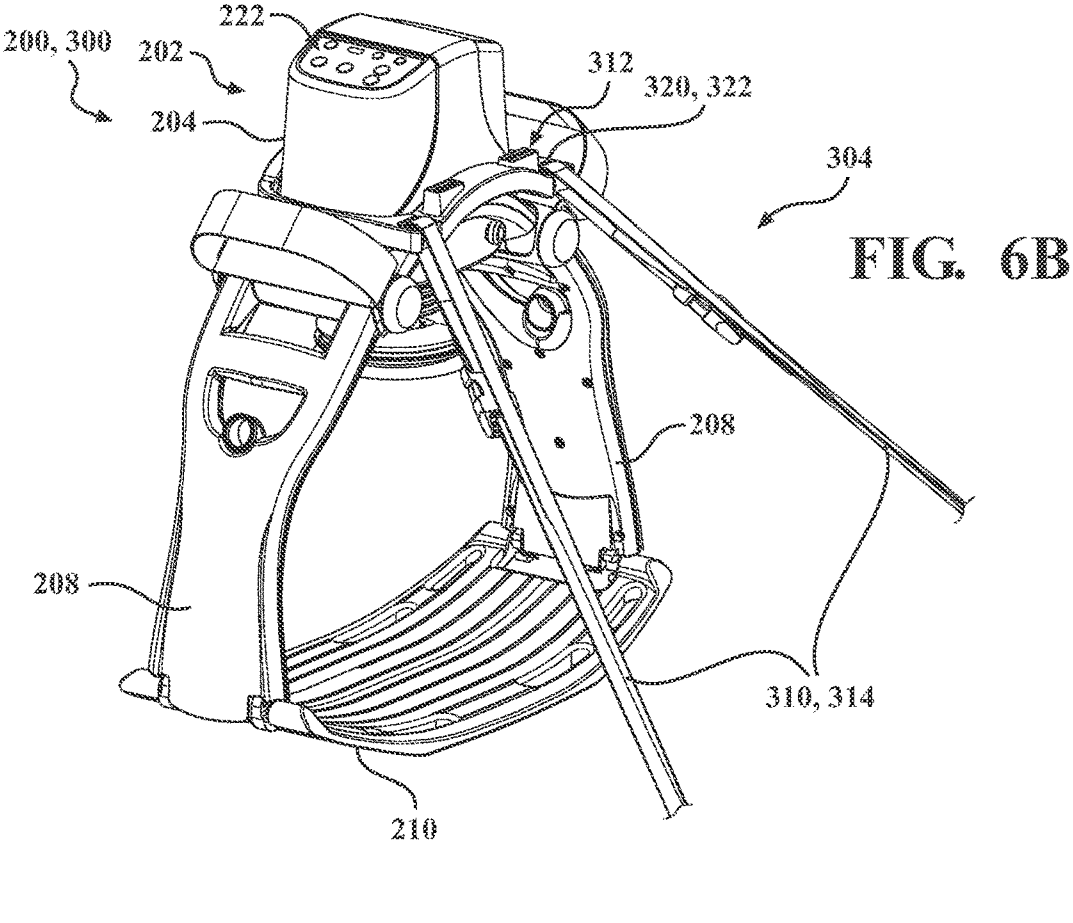
Figure 7A:
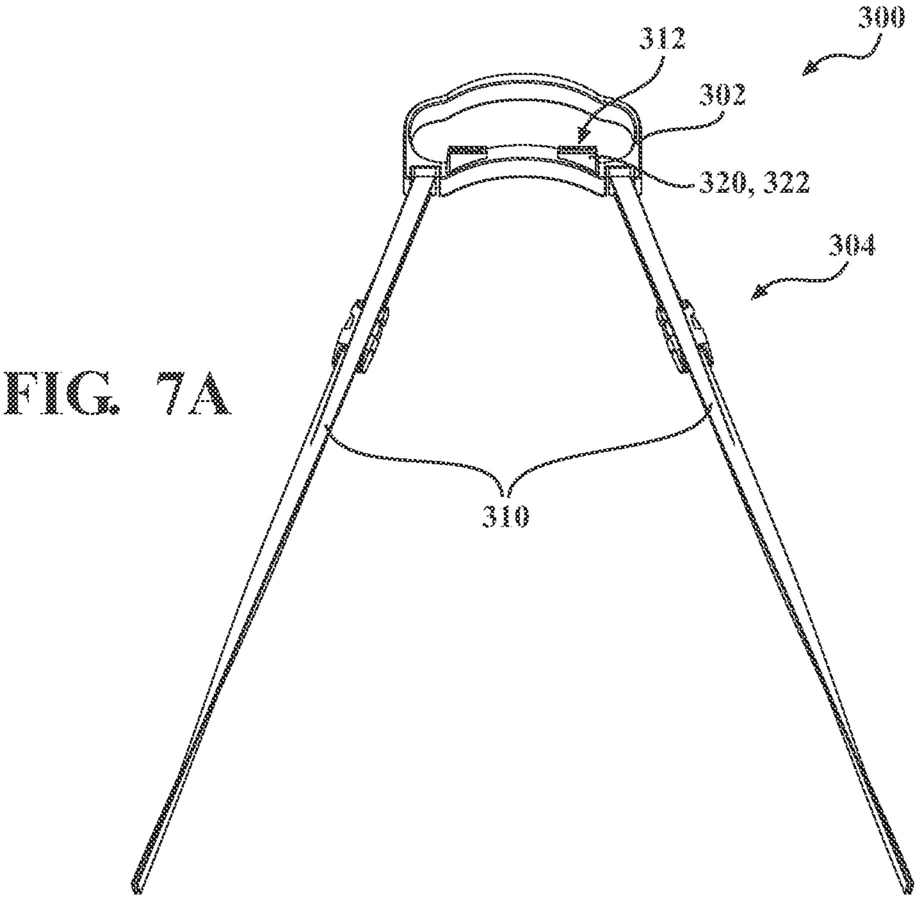
FIGS. 7A-7B are perspective views of the retainer.
Figure 7B:
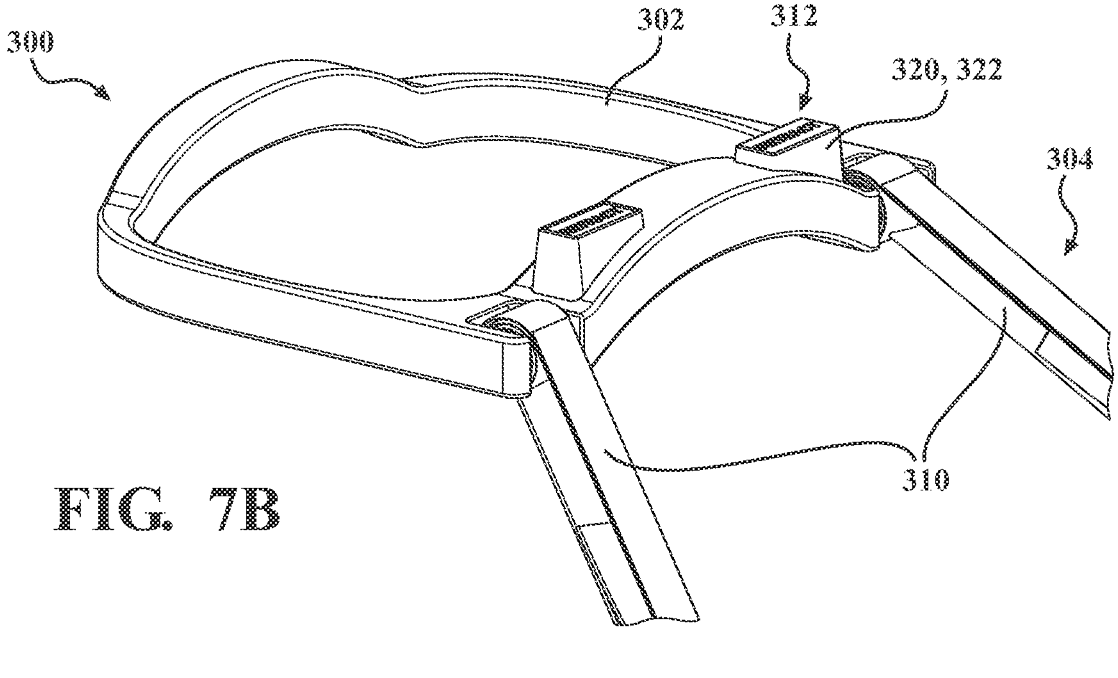

Referring now to FIGS. 3-5, the chest compression system 200 is shown secured to the intermediate frame 112 of the patient transport apparatus 110 by the retainer 300. The retainer 300 includes a collar 302 shaped for releasable engagement with the driver 202 of the chest compression system 200, and a brace 304 to brace the collar 302, together with the driver 202 of the chest compression system 200, relative to the intermediate frame 112 of the patient transport apparatus 110. The retainer 300 includes a retainer mount 306 operatively attached to or otherwise defined by the intermediate frame 112, and a tether 310 extending longitudinally and laterally between the retainer mount 306 and the collar 302.

In order to secure the chest compression system 200 to the patient transport apparatus 110, the collar 302 is moved into engagement with the driver body 204 and the brace 304 is moved into engagement with the collar 302. More specifically, the collar 302 is moved into engagement with the driver 202 of the chest compression system 200, and the tether 310 is secured to both of the retainer mount 306 and the collar 302 such that the collar 302 is secured to the intermediate frame 112. The components of the retainer 300 may be moved into engagement with the chest compression system 200 and the patient transport apparatus 110 in various sequences, orders, and the like. In the drawings, the collar 302 is depicted with a substantially rectangular profile so as to closely fit over or otherwise correspond to the profile of the driver 202 of the chest compression system 200. In certain versions, however, the collar 302 may be shaped to fit a differently-configured chest compression system 200.

As noted above, the brace 304 includes the retainer mounts 306 operatively attached to or otherwise defined by the intermediate frame 112. As shown in FIGS. 1 and 3-5, the retainer mounts 306 may be movably coupled to the intermediate frame 112. The arrangement allows the user to reposition the retainer mounts 306 relative to the patient and along at least a portion of the length of the intermediate frame 112. Each of the retainer mounts 306 may also include a retainer mount lock 308 to fix the respective retainer mount 306 relative to the intermediate frame 112. Here, the user can move the retainer 300 longitudinally relative to the patient until the retainer 300 is disposed in a desirable position and subsequently engage or activate the retainer mount lock 308 to secure the retainer 300 in position. In some versions, a plurality of different mounting locations for the retainer mounts 306 may be formed in or otherwise defined along a part of the intermediate frame 112. It will be appreciated that releasable coupling between the intermediate frame 112 and the retainer mounts 306 may be realized in a number of different ways, and configurations other than those illustrated throughout the drawings are contemplated by the present disclosure.

With continued reference to FIGS. 3-5, the retainer 300 includes tethers 310 extending between the retainer mount 306 and the collar 302 for bracing the collar 302 relative to the intermediate frame 112 of the patient transport apparatus 110. Here, the tethers 310 extend both longitudinally and laterally relative to the patient, which helps ensure that the chest compression system 200 is retained in a stable arrangement and is inhibited from moving relative to the patient about a longitudinal axis A1 and/or a lateral axis A2 (both axes are described in greater detail below). It will be appreciated that limiting movement of the chest compression system 200 relative to the patient transport apparatus

110 in both axes A1, A2 can promote improved usability and safety for caregivers, patients, and others during various use case scenarios (e.g., during transportation in an ambulance).

As shown in FIG. 3, the arrangement of the patient may correspond to (or otherwise define) the longitudinal and lateral axes A1, A2 and, during use, the chest compression system 200 is located approximately at the intersection of the axes A1, A2. The intersection, also referred to herein as an origin A0, defines zero points for each axis A1, A2. Relative to the origin A0, there are first and second lateral directions, as well as first and second longitudinal directions. Regarding the lateral directions, the first lateral direction is defined as moving away from the origin A0 and to the right of the patient's head, while the second lateral direction is defined as moving away from the origin A0 and to the left of the patient's head. As for the longitudinal directions, the first longitudinal direction is defined as moving away from the origin A0 and toward the patient's head, while the second longitudinal direction is defined as moving away from the origin A0 and toward from the patient's feet. It will be appreciated that the directions defined above are exemplary and non-limiting.

In the illustrated versions, the retainer 300 includes two tethers 310. Both of the tethers 310 extend in the second longitudinal direction. Furthermore, one of the tethers 310 extends in the first lateral direction, while the other tether 310 extends in the second lateral direction. In some versions, the retainer 300 may further include tethers 310 extending in the first longitudinal direction (and also in the first and second lateral directions, respectively). As noted above, the retainer mounts 306 may be movably mounted to the intermediate frame 112. As such, the degree to which each tether 310 extends in the first or second longitudinal direction may be adjusted by moving the respective retainer mounts 306.

Referring to FIGS. 6A-8, the tethers 310 are secured to the collar 302 in spaced relation from one another. In some versions, such as the version shown in FIG. 3, the retainer 300 further includes a retractor assembly 312 to adjust lengths of the tethers 310 extending between the collar 302 and the respective retainer mounts 306. In some versions, such as is depicted in FIG. 4, the tethers 310 may be realized as loops of webbing which define loop straps 314. Each of the loop straps 314 may include a loop adjuster 316 to adjust the length of the loop straps 314. FIGS. 6A-7B generically depict versions of tethers 310 with different configurations.

Figure 8:
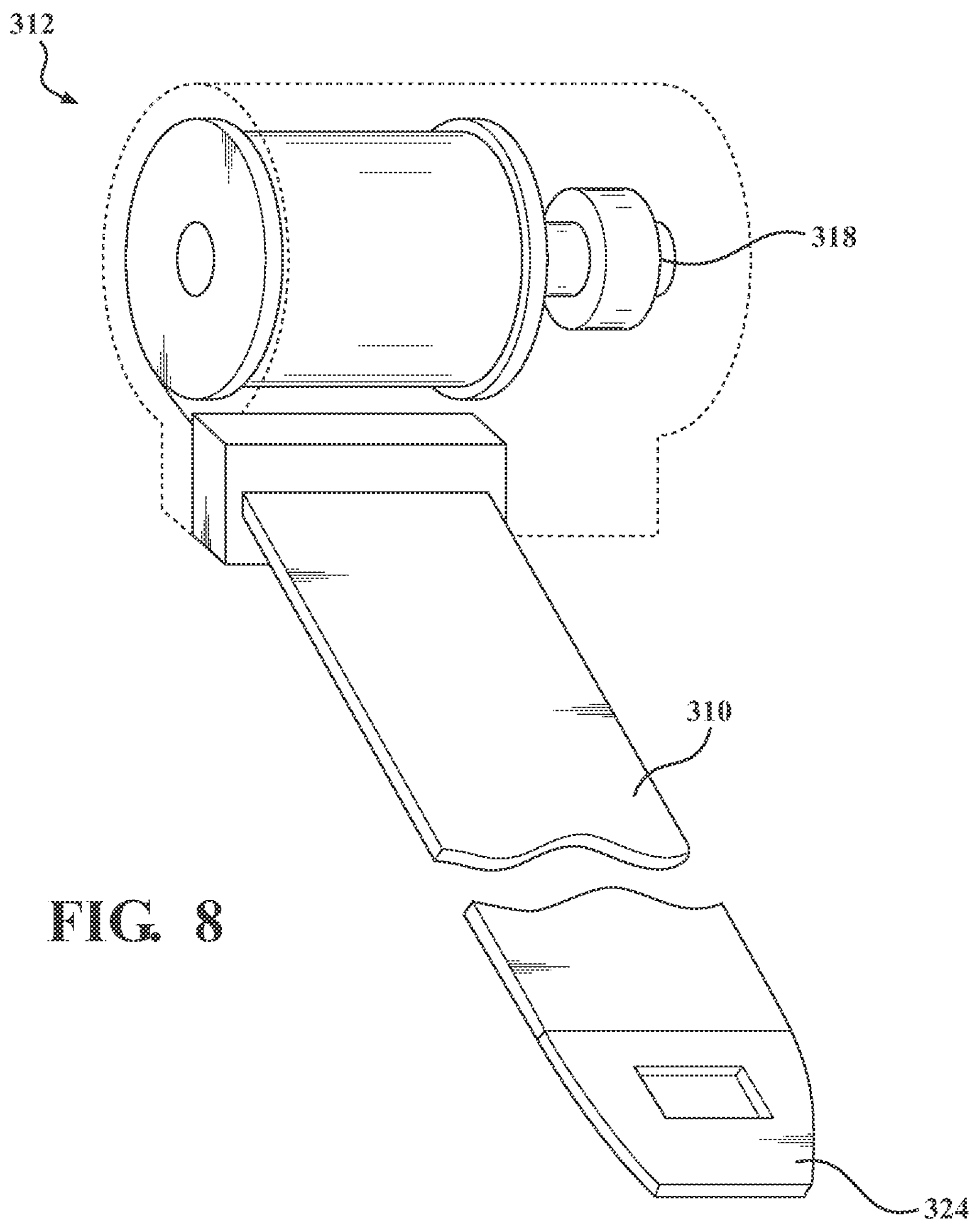
FIG. 8 is a perspective view of a retractor assembly.

In some versions, the retractor assembly 312 is operatively attached to the collar 302. However, it will be appreciated that the retractor assembly 312 may be operatively attached to the retainer mount 306 in some versions. The retractor assembly 312 may include a spring 318 arranged to urge the tether 310 toward the retractor assembly 312. With reference to FIG. 8, the spring 318 provides a rotational force which draws the tether 310 toward and into the retractor assembly 312. This allows the user to easily adjust the length of the tether 310 when arranging the retainer 300 relative to the chest compression system 200. Additionally, the spring 318 makes it easier to stow the tethers 310 inside of the retractor assembly 312, for example, for storing and/or transporting the retainer 300.

The retractor assembly 312 may further include a selector 320 for controlling the retractor assembly 312. In some versions, the selector 320 may be realized as a button 322 arranged for user engagement. Although the selector 320 is shown as being disposed on the collar 302 in the illustrated versions, the selector 320 may be located on the retainer mount 306. The selector 320 allows the user to control operation of the retractor assembly 312 between a first state in which the length of the tether 310 may be increased but not decreased, and a second state in which the length of the tether 310 may be increased or decreased. For example, the retractor assembly 312 may be biased into the first state until the button 322 is engaged by the user. After the button 322 is engaged, the retractor assembly 312 changes operation to the second state and the user may pull the tether 310 away from the retractor assembly 312 and toward either the collar 302 or retainer mount 306 (depending on where the retractor assembly 312 is located) until the tether 310 is of desired length. Additionally, the selector 320 could be engaged after the tether 310 is secured to both the collar 302 and the retainer mount 306 to draw any extraneous length of the tether 310 back into the retractor assembly 312. During use, the tether 310 remains at the desired length unless the selector 320 is engaged. After use, the user may engage the button 322 to draw the tether 310 back into the retractor assembly 312 for storage and/or transport.

In some versions, the retractor assembly 312 may be further operable in an interrupt state in which the length of tether 310 may not be increased or decreased. The retractor assembly 312 may be urged into the interrupt state when a tension of the retractor assembly 312 exceeds a predetermined tension threshold. In the event of a crash/vehicular collision, for example, undesired movement of the chest compression system 200 may put the retractor assembly 312 into the interrupt state such that the lengths of the tethers 310 do not change. This functionality is helpful in bracing the collar 302 and the chest compression system 200 relative to the intermediate frame 112 of the patient transport apparatus 110.

The tethers 310 may be removably attached to the retainer mount 306 and/or the collar 302. For example, in versions where the retractor assembly 312 is attached to the collar 302, the tether 310 extending therefrom may be removably secured to the retainer mount 306 when the retainer 300 is in use. As shown in FIG. 8, the tethers 310 may include a catch 324 to engage a corresponding buckle (not shown) attached to the retainer mount 306 and/or the collar 302. The tether 310 may be pulled away from the retractor assembly 312 by the user until the tether 310 is of a desired length, and the catch 324 can then be moved into engagement with the buckle to secure the tether 310 between the retractor assembly 312 and either the retainer mount 306 or the collar 302. In the illustrated version of FIGS. 6A-7B, the retractor is secured to the collar 302 and the buckle would therefore be secured to the retainer mount 306. After use, the catch 324 can be moved out of engagement with the buckle to detach the tether 310 from the retainer mount 306.

Figure 9A:
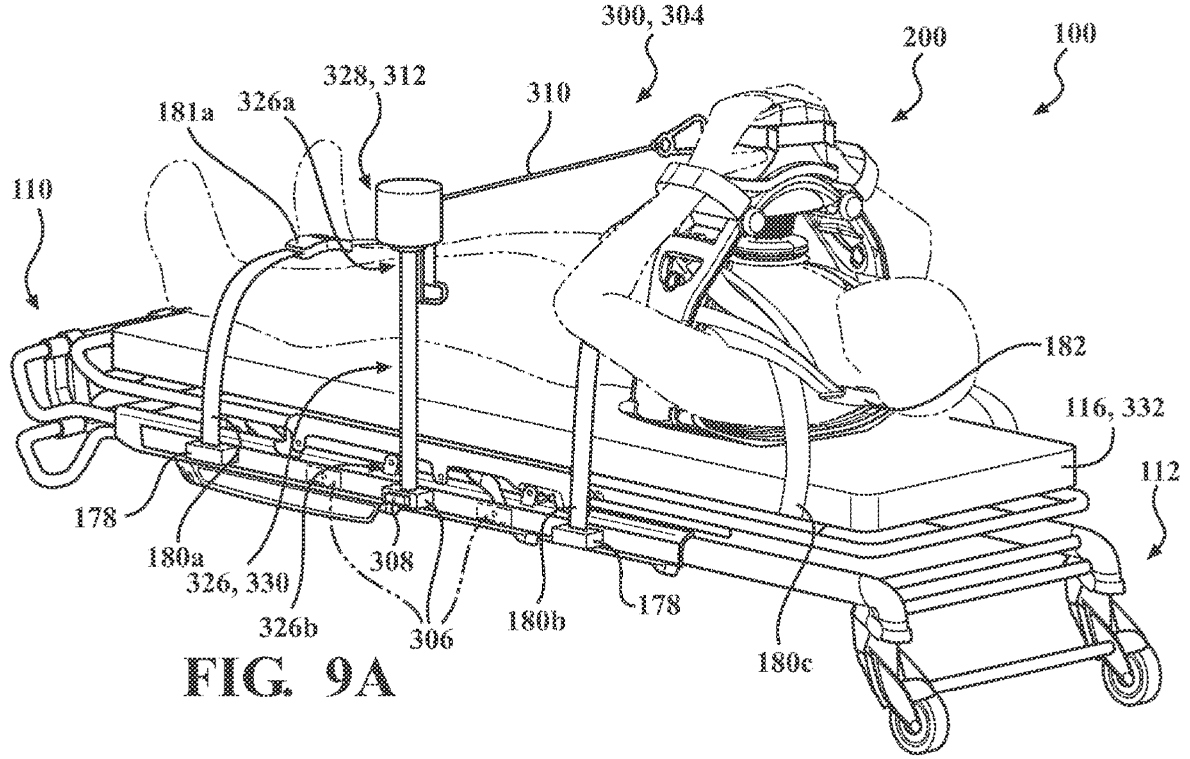
FIGS. 9A-9B are perspective views of another version of the retainer.
Figure 9B:
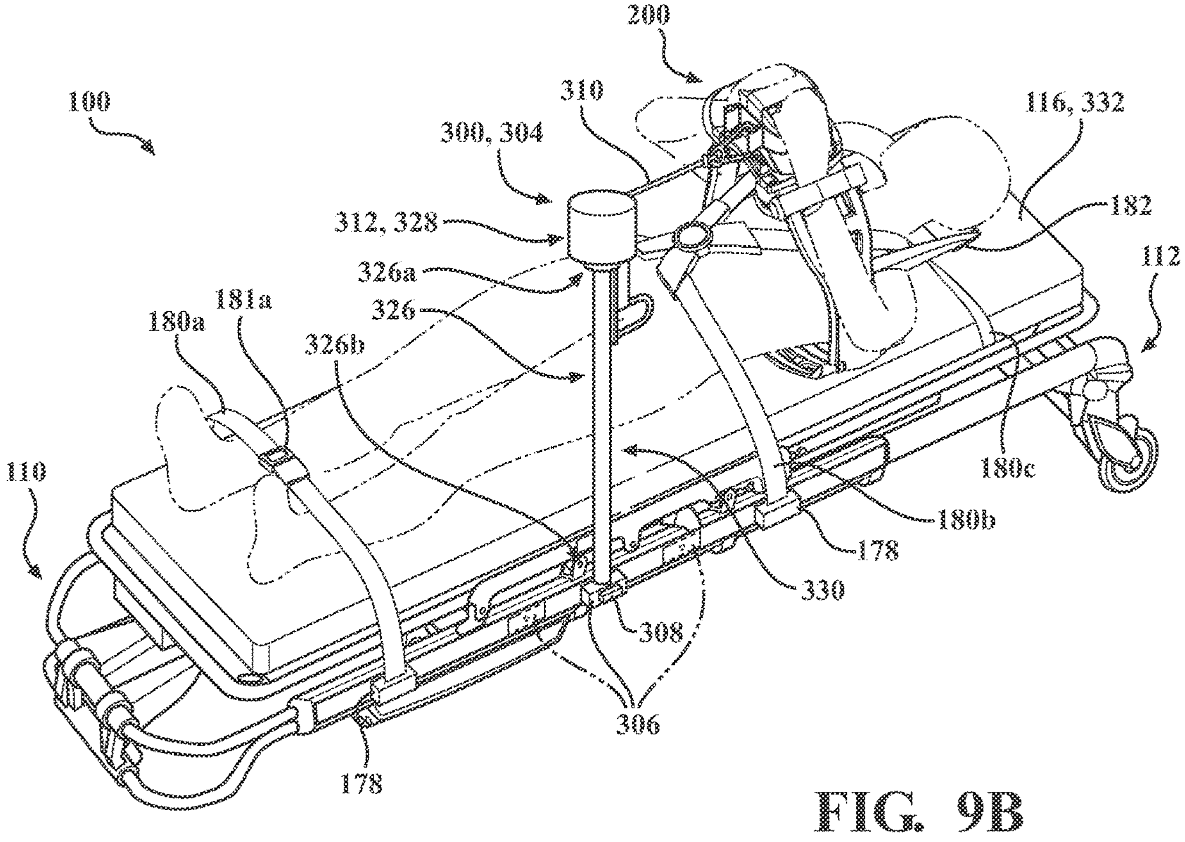

Referring to FIGS. 9A-9B, the brace 304 may further include a post 326 extending between a first end 326*a* and a second end 326*b*. The first end 326*a* is be operatively attached to the retainer mount 306, while the second end 326*b* includes an auxiliary retainer mount 328. The post 326 and auxiliary retainer mount 328 allow the user to adjust the height of one end of the tether 310 relative to the intermediate frame 112. To this end, the post 326 also includes a height adjustment mechanism 330 to facilitate height adjustment of the auxiliary retainer mount 328 relative to the intermediate frame 112. The height adjustment mechanism 330 may be realized by a telescopic section of the post 326. In some versions, the retainer mount 306 may allow the post 326 to be secured to the intermediate frame 112 such that at least a portion of the post 326 resides below the retainer mount 306. In other words, the retainer mount 306 may engage the post 326 between the first end 326*a* and the second end 326*b* of the post 326.

The retractor assembly 312 may be attached to the auxiliary retainer mount 328 such that the tether 310 extends from the auxiliary retainer mount 328 toward the collar 302. In some versions, the retractor assembly 312 may be attached to the collar 302 such that the tether 310 extends from the collar 302 toward the auxiliary retainer mount 328. The tether 310 is secured to the retractor assembly 312 at one end of the tether 310 and removably secured to either the auxiliary retainer mount 328 or the collar 302 at another end of the tether 310, depending on where the retractor assembly 312 is secured as noted above. As noted above, the tether 310 may include the catch 324 to engage the buckle attached to the auxiliary retainer mount 328 to allow the tether 310 to be removably attached to the auxiliary retainer mount 328 when the retractor assembly 312 is attached to the collar 302. In some versions, the buckle may be attached to the collar 302 to allow the tether 310 to be removably attached to the collar 302 when the retractor assembly 312 is attached to the auxiliary retainer mount 328.

Figure 10:
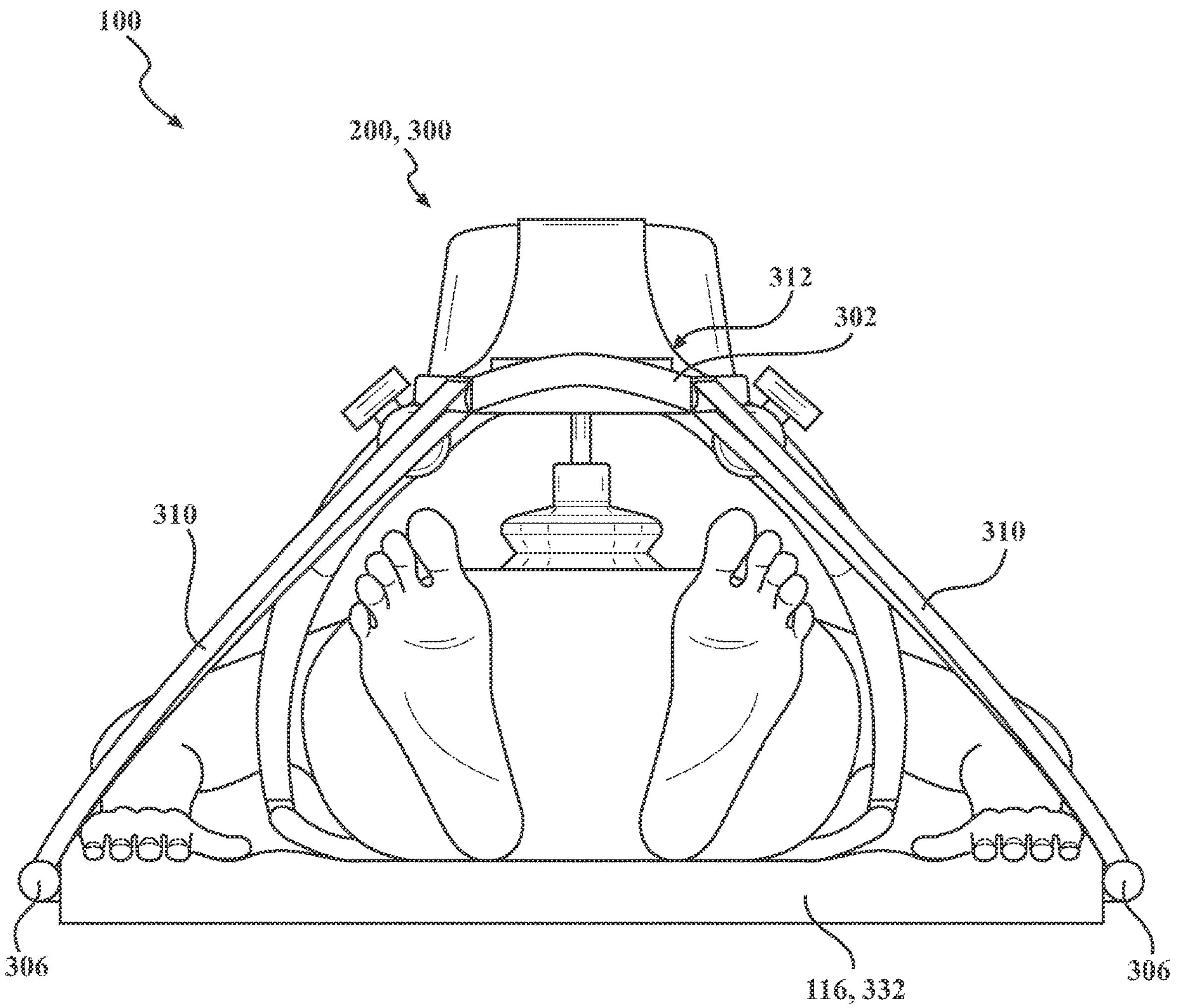
FIG. 10 is a perspective view of the patient care system showing a mattress is a compressed state.

Now referring to FIG. 10, the patient support deck 114 may further include a mattress 332 defining the patient support surface 116 for supporting the patient. Here, the base driver mount 210 is disposed between the patient and the mattress 332 and, because the tether 310 extends between the retainer mount 306 and the collar 302, the tether 310 thus urges the chest compression system 200 toward the intermediate frame 112 of the patient transport apparatus 110. As the tether 310 urges the collar 302 toward the intermediate frame 112, the chest compression system 200 is brought toward the patient support surface 116 (in this case, the mattress 332). As such, the mattress 332 may be compressed by the patient and chest compression system 200 due to the tension on the tethers 310. FIG. 10 shows the mattress 332 in a compressed state as a result of the retainer 300 urging the chest compression system 200 toward the intermediate frame 112.

In order for the retainer 300 to secure the chest compression system 200 to the patient transport apparatus 110 with adequate strength to withstand the forces of transport or vehicular collision, the retainer 300 may be at least partially formed of a suitably strong material. For example, the tether 310 may be formed of strong fabric or webbing, such as polypropylene, polyester, nylon, analogous materials, combinations thereof, and the like, which may be coated, treated, or otherwise configured in various ways. Similarly, the collar 302 may be at least partially formed of a suitably rigid material to ensure stability and consistent retention. For example, the collar 302 may be formed of metal, rigid plastic, polymers, combinations thereof, and the like. In some versions, the collar 302 may be at least partially formed of a suitably resilient material in order to permit limited, resilient movement between the driver body 204 and the patient transport apparatus 110. In some versions, the collar 302 may be manufactured from elastomers, such as rubber. Other configurations are contemplated.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient care system for treating a patient, the patient care system comprising:
- a patient transport apparatus including:
  - a base arranged for movement along floor surfaces,
  - an intermediate frame arranged for movement relative to the base between a plurality of vertical configurations, and
  - a patient support deck operatively attached to the intermediate frame and defining a patient support surface for supporting the patient;
- a chest compression system configured to provide automatic chest compressions to a patient, the chest compression system including:
  - a driver having a driver body movably supporting a plunger arranged for providing chest compressions to the patient, and
  - a driver frame with a base driver mount disposed on the patient support surface and lateral driver mounts extending between the base driver mount and the driver body to support the driver adjacent to the chest of the patient; and
- a retainer for securing the chest compression system to the intermediate frame of the patient transport apparatus, the retainer including:
  - a collar shaped for releasable engagement with the driver of the chest compression system,
  - a brace having:
    - a mount operatively attached to the intermediate frame; and
    - a post extending between: a first end operatively attached to the intermediate frame, and a second end operatively attached to the mount, and
  - a tether extending longitudinally and laterally between the mount and the collar to brace the collar, together with the driver of the chest compression system, relative to the intermediate frame of the patient transport apparatus.

2. The patient care system of claim 1, wherein the retainer further includes a retractor assembly to adjust a length of tether between the collar and the mount.

3. The patient care system of claim 2, wherein the retractor assembly includes a selector operable to change the retractor assembly between:
- a first state in which the length of tether may be increased, and
- a second state in which the length of tether may be increased or decreased.

4. The patient care system of claim 3, wherein the retractor assembly is further operable in an interrupt state in which the length of tether may not be increased or decreased.

5. The patient care system of claim 4, wherein the retractor assembly is urged into the interrupt state when a tension on the retractor assembly exceeds a predetermined tension threshold.

6. The patient care system of claim 3, wherein the selector includes a spring arranged to urge the tether toward the retractor assembly.

7. The patient care system of claim 3, wherein the selector includes a button arranged for user engagement.

8. The patient care system of claim 2, wherein the retractor assembly is operatively attached to the collar.

9. The patient care system of claim 2, wherein the retractor assembly is operatively attached to the mount.

10. The patient care system of claim 2, wherein the post includes a height adjustment mechanism to facilitate adjustment of the height of the mount relative to the intermediate frame.

11. The patient care system of claim 10, wherein the retractor assembly is operatively attached to the height adjustment mechanism.

12. The patient care system of claim 1, further comprising a patient harness assembly including a plurality of straps configured to secure the patient to the patient support surface.

13. The patient care system of claim 12, wherein the patient harness assembly includes a multipoint waist buckle system.

14. The patient care system of claim 1, wherein the patient transport apparatus further includes a mattress defining the patient support surface to support the patient.

15. The patient care system of claim 14, wherein the retainer is configured to urge the collar, together with the driver of the chest compression system, towards the mattress such that the mattress compresses.

16. The patient care system of claim 1, wherein the tether includes a loop strap with a loop adjuster to selectively adjust a length of the loop strap.

17. A patient care system for treating a patient, the patient care system comprising:

a patient transport apparatus including:
  a base arranged for movement along floor surfaces,
  an intermediate frame arranged for movement relative to the base between a plurality of vertical configurations, and
  a patient support deck operatively attached to the intermediate frame and defining a patient support surface for supporting the patient;

a chest compression system configured to provide automatic chest compressions to a patient, the chest compression system including:
  a driver having a driver body movably supporting a plunger arranged for providing chest compressions to the patient, and
  a driver frame with a base driver mount disposed on the patient support surface and lateral driver mounts extending between the base driver mount and the driver body to support the driver adjacent to the chest of the patient; and a retainer for securing the chest compression system to the intermediate frame of the patient transport apparatus, the retainer including:
  a collar shaped for releasable engagement with the driver of the chest compression system,
  a brace having:
    a mount operatively attached to the intermediate frame; and
    a post extending between: a first end operatively attached to the intermediate frame, and a second end operatively attached to the mount,
  a tether extending longitudinally and laterally between the mount and the collar to brace the collar, together with the driver of the chest compression system, relative to the intermediate frame of the patient transport apparatus, and
  a retractor assembly to adjust a length of tether between the collar and the mount.

18. The patient care system of claim 17, wherein the post includes a height adjustment mechanism to facilitate adjustment of the height of the mount relative to the intermediate frame.

* * * * *